(12) United States Patent
Åkerberg

(10) Patent No.: US 6,839,333 B1
(45) Date of Patent: Jan. 4, 2005

(54) TDMA-TDD/FDD RADIO COMMUNICATION SYSTEM AND CHANNEL SELECTION METHOD AND APPARATUS FOR SUCH A SYSTEM

(75) Inventor: Dag E:son Åkerberg, Kungsägen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/236,007

(22) Filed: Jan. 22, 1999

(30) Foreign Application Priority Data

Jan. 23, 1998 (SE) .............................................. 9800202

(51) Int. Cl.[7] ................................................ H04Q 7/00
(52) U.S. Cl. ........................ 370/330; 370/322; 455/443
(58) Field of Search ................................. 370/321, 322, 370/330–336, 344; 455/426, 450, 437, 434, 443, 444, 476, 447, 449, 448

(56) References Cited

U.S. PATENT DOCUMENTS

| | | | | |
|---|---|---|---|---|
| 5,193,091 A | * | 3/1993 | Crisler et al. ................ | 370/336 |
| 5,228,029 A | * | 7/1993 | Kotzin ........................ | 370/331 |
| 5,408,496 A | * | 4/1995 | Ritz et al. .................... | 345/132 |
| 5,999,818 A | * | 12/1999 | Gilbert et al. .............. | 455/448 |
| 6,240,076 B1 | * | 5/2001 | Kanerva et al. ............ | 370/330 |
| 6,272,117 B1 | * | 8/2001 | Choi .......................... | 370/330 |
| 6,289,006 B1 | * | 9/2001 | Schobl ....................... | 370/330 |
| 6,327,254 B1 | * | 12/2001 | Chuah ......................... | 370/328 |
| 6,356,540 B1 | * | 3/2002 | Kojiro ........................ | 370/330 |
| 6,433,668 B1 | * | 8/2002 | Ragan et al. ............... | 340/7.27 |

* cited by examiner

Primary Examiner—Vivian Chin
Assistant Examiner—Charles Craver

(57) ABSTRACT

A TDMA radio communication system combines time and frequency division duplex. It includes a first base station transmitting in first downlink frames on a first carrier frequency in a first frequency band and receiving in first uplink frames, which have no time overlap with the first downlink frames, on a second carrier frequency in a second frequency band, which has no frequency overlap with the first frequency band. The system also includes a second base station, which has partially overlapping radio coverage area with the first base station, but is geographically separated from the first base station in order to avoid transmission from one base station disturbing reception from radio terminals on the other base station. The second base station transmits in second downlink frames on the first carrier frequency and receives in second uplink frames, which have no time overlap with the second downlink frames, on the second carrier frequency. The first and second downlink frames are offset to have no time overlap. A network controller synchronizes transmission from the first and second base stations.

16 Claims, 4 Drawing Sheets

TDMA-TDD/FDD RADIO COMMUNICATION SYSTEM AND CHANNEL SELECTION METHOD AND APPARATUS FOR SUCH A SYSTEM

This application claims priority under 35 U.S.C. §§ 119 and/or 365 to Application No. 9800202-5 filed in on Jan. 23, 1998; the entire content of which is hereby incorporated by reference.

The present invention relates in general to the mobile radio communication field and, in particular, to a system for Time Division Multiple Access through a combination of Time Division Duplex and Frequency Division Duplex. The invention also relates to a radio terminal controlled dynamic channel selection method and apparatus for such a system.

BACKGROUND

The "Digital Enhanced Cordless Telecommunications" system (DECT) is standardized by the European Telecommunications Standards Institute and is an example of a system that uses TDMA-TDD (Time Division Multiple Access—Time Division Duplex) for radio communication. In DECT, transmission is synchronized between all base stations, i.e. all downlink transmission occurs during a first 5 ms period of a frame and all uplink transmission occurs during a second 5 ms period of the same frame. On one TDMA-TDD carrier frequency the first 5 ms period is dedicated to 12 downlink time slots and the second 5 ms period is dedicated to 12 uplink time slots, enabling the use of one single carrier frequency for both downlink and uplink communication of the same bi-directional connection.

Known TDMA-FDD (Time Division Multiple Access—Frequency Division Duplex) systems separate downlink transmission from uplink reception by performing the two tasks on different carrier frequencies and at different times in the mobile radio stations, but simultaneously in the radio base stations. The GSM and D-AMPS systems are examples of TDMA-FDD systems.

TDMA-TDD and TDMA-FDD systems both have their advantages and disadvantages. WO 97/21287 (ADVANCED MICRO DEVICES) describes a system that attempts to combine the advantages of TDMA-TDD and TDMA-FDD. In this combined TDMA-TDD/FDD system the uplink and downlink transmission between a radio base station (BS) and a mobile radio station (MS) are separated both in time and frequency. The uplink and downlink transmissions use separate frequency bands, as in TDMA-FDD, but uplink and downlink transmissions also use separate time intervals, as in TDMA-TDD. However, a disadvantage of the system described in WO 97/21287 is that, by transferring the uplink transmission to a frequency band that is separate from the downlink transmission band, each band will only be used 50% of the time, which is a significant waste of valuable spectrum resources.

SUMMARY

A primary object of the present invention is to provide a more spectrum efficient combined TDMA-TDD/FDD system.

Another object of the present invention is to provide such a spectrum efficient TDMA-TDD/FDD system, which allows asymmetrical traffic uplink and downlink, e.g. more traffic downlink, as may be required by, for example by an Internet connection.

It is a further object of the present invention to provide such a spectrum efficient TDMA-TDD/FDD system, which allows mobile station controlled dynamic channel selection (DCS).

Yet another object of the invention is to provide such a spectrum efficient TDMA-TDD/FDD system, which allows communicating in a cost-effective way over, fixed long distance RLL (Radio in the Local Loop) connections.

These objects are achieved in accordance with the appended claims.

Briefly, these and further objects of the present invention are achieved by providing two sets of radio base stations in a synchronized TDMA-TDD/FDD system which uses two frequency bands. The first set of base stations uses available frequencies part of the time and a second set of base stations uses available frequencies during the remaining part of the time.

In one embodiment of the present invention half of the communications use a first set of base stations and the other half of communications use a second set of base stations. There is a time offset between the two sets, thus allowing transmission downlink and uplink on all frequencies all the time, but not allowing simultaneous transmission and reception in the same unit, (e.g. same BS or same MS). In this embodiment, a first frequency band is always used for uplink and a second frequency band is always used for downlink transmission. In this embodiment the base stations in the two sets have partially overlapping radio coverage, but are geographically separated in order to avoid that a base station in one set during transmission disturbs reception in a base station in the other set.

In another embodiment of the present invention half of the communications also use a first set of base stations and the other half of communications use a second set of base stations. However, in this embodiment the first set uses time slots on a carrier frequency in a first frequency band for downlink transmission and time slots on a carrier frequency in a second frequency band for uplink transmission, whereas the second set uses time slots on the carrier frequency in the second frequency band for downlink transmission and time slots on the carrier frequency in the first frequency band for uplink transmission. This allows transmitting both downlink and uplink on all frequencies, but avoids simultaneous transmission and reception in the same unit, (e.g. same BS or same MS). In this embodiment a first time interval is always used for uplink transmission and a second time interval is always used for downlink transmission. This arrangement facilitates asymmetrical use of the frequency bands as will be explained further on.

In a further embodiment, the present invention is applied to fixed connections in an RLL system, e.g. connections between a network controller and remote buildings at a considerable distance, e.g. of the order of 20 km.

In yet a further embodiment of the present invention, dynamic channel selection (DCS) is used by listening in the MS not only, as in the prior art, to the downlink time slots not used by the mobile station itself, but also to downlink time slots of another set of base stations, thus enabling a channel selection of channels belonging to either sets of base stations when performing handover or initial selection of a channel for a call.

One important technical advantage of the present invention is that it provides spectrum efficiency for a synchronized TDMA-TDD/FDD system by employing the unused 50% of the time that becomes available in radio base stations when bi-directional (duplex) communication channels only use 50% of an uplink carrier and 50% of a downlink carrier frequency.

Another important technical advantage of the present invention is that the previously unused 50% of the time available on uplink and downlink carriers is made use of by delaying a part, e.g. 50%, of the transmission, thus satisfying any regulatory requirement to always use one frequency band uplink and another frequency band downlink.

Still another important technical advantage is that the previously unused 50% of the time available on uplink and downlink carriers, when no regulation according to the previous paragraph exists, can be made use of in an alternative way that, instead of assigning frequency bands to up- and downlink respectively, assigns a first time period to downlink and a second time period to uplink. This assignment has the advantage of enabling asymmetrical traffic up- and downlink as e.g. required for Internet applications. Any multi-channel usage can, as an additional advantage, use frequency hopping between time slots of one multi-time-slot series of bursts thus improving transmission quality.

A further important technical advantage of the present invention is that it combines the cost advantages of TDMA-TDD with the advantage of long distance mobile telephony of TDMA-FDD. This is particularly valuable in RLL because larger distances from a network controller to remote base stations can be handled by TDMA-TDD/FDD radio connections, whereas local short distance radio connections between base stations and mobile stations can use the conventional TDMA-TDD, however not excluding TDMA-TDD/FDD as an alternative possibility.

Yet another important technical advantage is that the inventive TDMA-TDD/FDD system provides for the first time in mobile telephony the advantages of TDMA-FDD, such as long distance radio connections, without requiring frequency planning, because the inventive TDMA-TDD/FDD system, in one embodiment, employs dynamic channel selection (DCS) by the mobile stations, which is common in TDMA-TDD systems, but which has not been applied to TDMA-FDD systems before.

Still another advantage of the present invention is that it allows two operators operating in the same frequency bands. Previously different operators of TDMA-FDD systems were restricted to different frequency bands.

BRIEF DESCRIPTION OF THE DRAWINGS

The invention, together with further objects and advantages thereof, may best be understood by making reference to the following description taken together with the accompanying drawings, in which.

DETAILED DESCRIPTION

Terminology of prior art TDMA-TDD and TDMA-FDD systems is inconsistent. For the purposes of this description the following terminology will therefor be used:

A downlink frame is a collection of consecutive time slots (bursts) transmitted from a base station.

An uplink frame is a collection of consecutive time slots received in a base station.

A duplex frame is the combination of the downlink and uplink frames.

Figure 1:
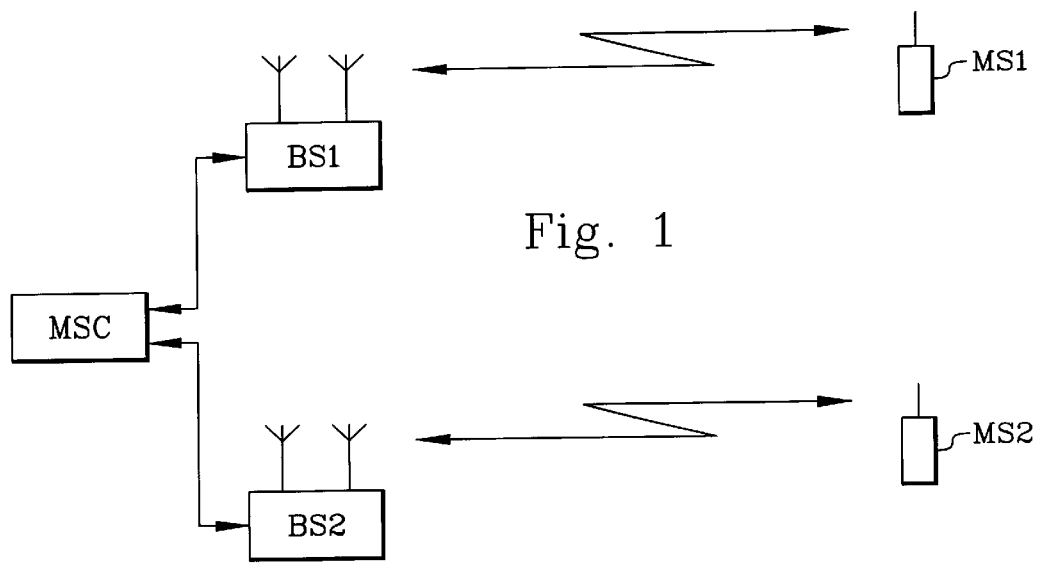
FIG. 1 schematically shows a cellular mobile radio communication system.

FIG. 1 schematically shows a part of a cellular mobile radio communication system. A network controller, e.g. a mobile services switching center MSC, is connected to two geographically separated base stations BS1 and BS2 in the same area (partially overlapping radio coverage). Base stations BS1, BS2 are in radio contact with respective mobile radio stations MS1 and MS2. The present invention is primarily concerned with the nature of the radio connection between these base and mobile stations.

Figure 2:
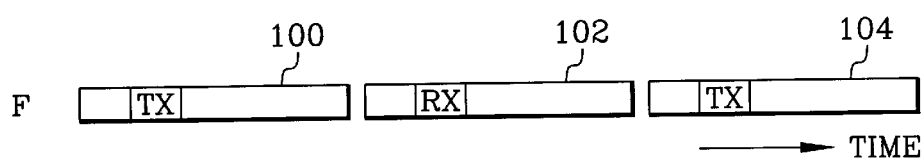
FIG. 2 schematically shows the usage of a carrier frequency in a TDMA-TDD system.

FIG. 2 schematically shows the usage of a carrier frequency in a frequency band used by a prior art TDMA-TDD system. A base station, for example BS1, transmits downlink to mobile station MS1 in a time slot marked TX in a downlink frame 100 on a carrier frequency F. Mobile station MS1 transmits uplink to base station BS1 in a time slot marked RX in an uplink frame 102 (the slot is marked RX to indicate that during this time slot the base station operates as a receiver) on the same carrier frequency F. Downlink frames 100, 102 together form a duplex frame. Downlink frame 104 is the first part of the next duplex frame, in which this pattern is repeated. It is noted that time slots TX and RX, which belong to the same duplex channel, have the same position relative to the beginning of their respective frame (downlink and uplink).

Figure 3:
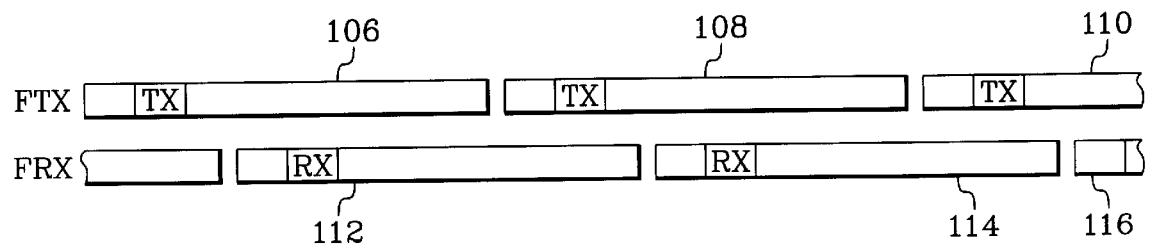
FIG. 3 schematically shows the usage of two carrier frequencies in a TDMA-FDD system.

FIG. 3 schematically shows the usage of two carrier frequencies in two frequency bands used by a prior art TDMA-FDD system, such as the GSM system. In this case downlink transmission is separated from uplink transmission by performing the two tasks on different carrier frequencies FTX and FRX. Duplex connections are formed by the repeated downlink and uplink time slots TX, RX on frame pairs (106, 112), (108, 114) and (110, 116). Note that the uplink frames are delayed (3 time slots in GSM) with respect to the downlink frames when comparing transmission and reception in a base station.

Figure 4:
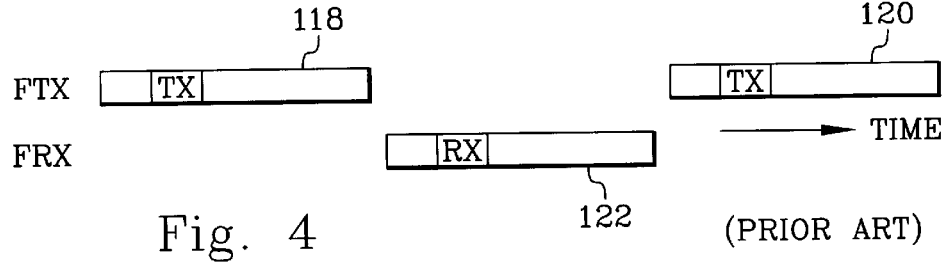
FIG. 4 schematically shows the usage of two carrier frequencies in a prior art TDMA-TDD/FDD system.

FIG. 4 schematically shows the usage of two carrier frequencies in two frequency bands in a prior art TDMA- TDD/FDD system. As in TDMA-FDD downlink transmission is separated from uplink transmission by performing the two tasks on different carrier frequencies FTX and FRX. However, this combined system also resembles a TDMA-TDD system, since downlink and uplink frames are also separated in time in the same way as in a TDMA-TDD system. A duplex frame is formed by downlink frame 118 and uplink frame 122. Downlink frame 120 is the first part of the next duplex frame.

As is apparent from FIG. 4 this prior art TDMA-TDD/FDD system uses each carrier frequency only 50% of the time. During the blank time periods the base station neither transmits nor receives, which is very inefficient.

Figure 5:
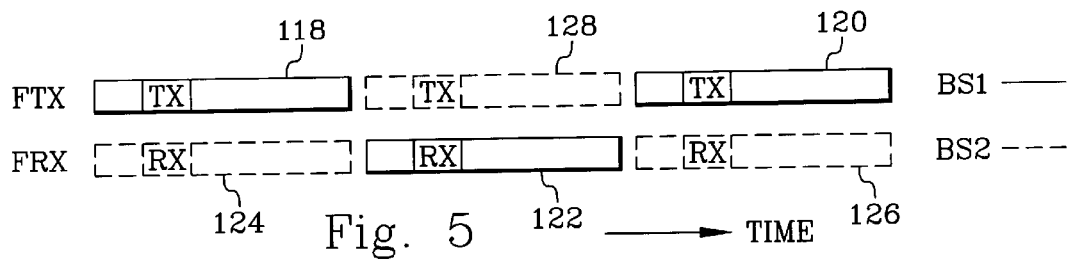
FIG. 5 schematically shows the usage of two carrier frequencies according to an embodiment of the present invention.

FIG. 5 schematically shows the usage of two carrier frequencies in two non-overlapping frequency bands according to an embodiment of the present invention.

As in the TDMA-TDD system in FIG. 4, downlink frames 118, 120 and uplink frame 122 are assumed to include the duplex connection BS1-MS1. However, according to the present invention the blank time periods of FIG. 4 are used by another base 10 station, for example base station BS2 in FIG. 1, to provide further connections, such as a connection BS2-MS2. This is represented by the dashed downlink and uplink frames 128 and 124, 126, respectively. In this and several of the following figures connection BS2-MS2 uses the same time slot as connection BS1-MS1. However, connection BS2-MS2 may alternatively use any time slot in that frame. Also note that base station BS2 still transmits on frequency FTX and receives on frequency FRX, but the transmission (and reception) is delayed half a duplex frame as compared to base station BS1. The same principle may be used for other carrier frequency pairs in the two frequency bands to which frequencies FTX and FRX belong. Thus, by providing two sets of synchronized base stations and time shifting the transmission (and reception) of the sets, the present invention fills out the blank time periods in the prior art system of FIG. 4. The synchronizing and time shifting is controlled by network controller MSC in FIG. 1. The base stations BS1 and BS2 have partially overlapping radio coverage, but are geographically sufficiently separated, so that reception from mobile stations by one base station is not disturbed by transmission to mobile stations by the other base station. Since the frequencies FTX and FRX are different (for example 45 MHz apart in the GSM system), a separation of about 10 m will usually be sufficient. This embodiment of the present invention also restricts downlink transmission to one frequency band and uplink transmission to another frequency band, a feature that is often required by regulations in some countries.

Figure 6:
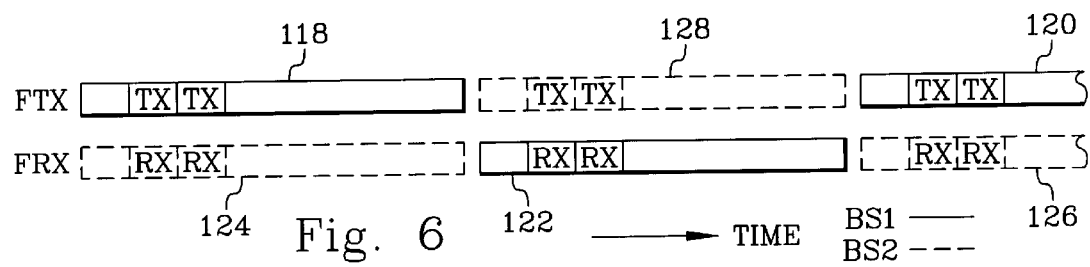
FIG. 6 schematically shows the usage of two carrier frequencies in an embodiment that implements full rate channels in a GSM system that has been modified in accordance with the present invention.

FIG. 6 schematically shows the usage of two carrier frequencies in two non-overlapping frequency bands in an embodiment that implements full rate channels in a GSM system that has been modified in accordance with the present invention. The delay between uplink frames and downlink frames has been increased from 3 to 8 time slots in order to separate transmission and reception by the base station in both time and frequency. Furthermore, the "idle" time periods are filled by a second base station, the transmission and reception of which is synchronized with, but delayed one downlink frame with respect to the first base station. Full rate channels are implemented by using two time slots in each downlink and uplink frame. In this embodiment, two time slots in every downlink and uplink frame are allocated to the full rate channel. In the embodiment illustrated in FIG. 6, these two time slots are consecutive. However, this is not necessary. They could also be separated by, for example, 1, 2 or 3 time slots.

Figure 7:
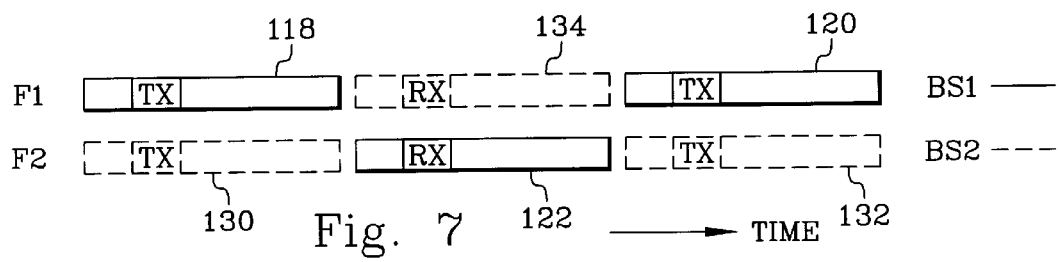
FIG. 7 schematically shows the usage of two carrier frequencies according to an alternative embodiment of the present invention.

FIG. 7 schematically shows the usage of two carrier frequencies in two non-overlapping frequency bands according to an alternative embodiment of the present invention. As in the TDMA-TDD system in FIG. 4 and the embodiment of FIG. 5, downlink frames 118, 120 and uplink frame 122 are assumed to include the duplex connection BS1-MS1. Duplex connection BS2-MS2 is provided by downlink frames 130, 132 and uplink frame 134. However, in this alternative embodiment downlink and uplink transmissions are not restricted to separate frequency bands. Instead the synchronized (by the MSC) base stations of the two sets transmit simultaneously and receive simultaneously. Note that each carrier frequency is used for both downlink and uplink transmission (therefore they have been denoted F1 and F2 rather than FTX an FRX as in FIG. 5). This alternative embodiment may be characterized by saying that all base stations "do the same thing (transmit or receive) at the same time", whereas the embodiment of FIG. 5 may be characterized by saying that all base stations "do the same thing (transmit or receive) on the same frequency band". Furthermore, this embodiment does not require a geographical separation of base stations BS1 and BS2.

Figure 8:
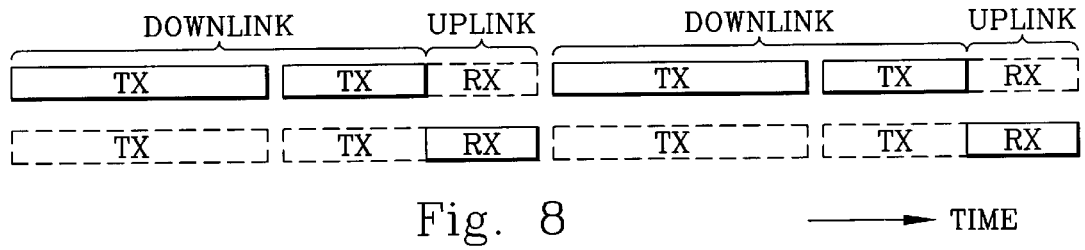
FIG. 8 schematically shows the usage of two carrier frequencies according to an asymmetrical embodiment of the present invention.

FIG. 8 schematically shows the usage of two carrier frequencies in two non-overlapping frequency bands according to an asymmetrical embodiment of the present invention. A further analysis of the statement that base stations "do the same thing (transmit or receive) at the same time" of the previous paragraph reveals that it in such an embodiment it is actually not necessary that downlink frames have the same duration as uplink frames. This leads to the possibility of an asymmetrical embodiment of the present invention, as illustrated in FIG. 8. In the embodiment of FIG. 8 the two available carrier frequencies are reserved for only two duplex connections, BS1-MS1 and BS2-MS2, respectively. These connections are both asymmetrical in the sense that the downlink frames are much longer than the uplink frames. This asymmetry is very useful, for example, when a mobile station is connected to the Internet. Such an Internet connection is characterized by transmitting much more data to a mobile station than is received from the mobile station. An asymmetrical connection may be established by the network controller MSC by reserving one carrier frequency from each band. However, it is to be noted that if such an asymmetrical connection is established, the other connection (which fills in the blank periods) on the same carrier frequencies must also have exactly the same asymmetry (since it has to "do the same thing (transmit or receive) at the same time").

Figure 9:
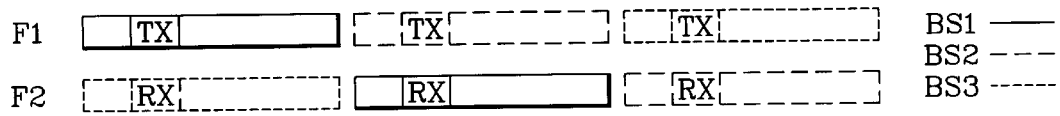
FIG. 9 schematically shows the usage of two carrier frequencies according to another embodiment of the present invention.

FIG. 9 schematically shows the usage of two carrier frequencies in two non-overlapping frequency bands according to another embodiment of the present invention. In this embodiment a third set of base stations, including a base station BS3 is added. The base stations of each set transmit on frequency FTX and receive on frequency FRX. This embodiment illustrates the fact that more than two sets of base stations may be used to implement the basic idea of the present invention. Since one of the advantages of the present invention is to provide the possibility to have several operators using the same frequency bands, this embodiment is attractive if more than two operators are allocated the same frequency bands. Another advantage of this embodiment is if one operator has more traffic than another operator using the same frequency bands. In this case the first operator may use two sets of base stations, while the other operator uses only one set.

Figure 10:
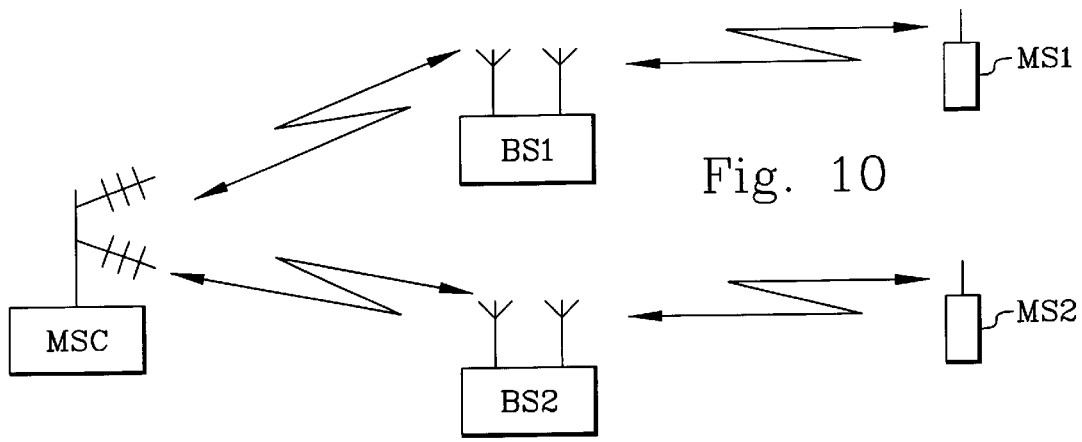
FIG. 10 schematically shows a cellular mobile radio communication system with radio connection between network controller and radio base stations.

FIG. 10 schematically shows a cellular mobile radio communication system with radio connection between network controller and radio base stations. As explained earlier, transmission and reception in base stations does, according to the invention, not occur simultaneously, thus enabling substantial cost savings in the base stations, because it is technically simpler to separate transmission and reception in time than in frequency. However, if simultaneous transmission and reception is necessary, as may be the case in network controllers, division in frequency is possible (at an increased cost) using filters and directional antennas in the controller. In FIG. 10 there are radio base stations BS1, BS2 using different offsets for communicating with the respective mobile stations MS1, MS2. The network controller MSC is treated transmission-wise as a mobile station, thus causing simultaneous transmission and reception in the controller.

In an alternative embodiment, not shown in FIG. 10, there are two network controllers, each associated with one of the radio base stations BS1, BS2. This embodiment can be used if two independent operators are active in the same geographical area. The invention requires that they synchronize their systems, but otherwise they can operate the systems fully independently, since each of them is assigned 50% of the time available on the frequency bands.

The prior art mobile radio system of FIG. 2 may employ dynamic channel selection, DCS. State of the art DCS for DECT TDMA-TDD applications is described in section 11.4 of ETSI ETS 300 175-3: "Radio Equipment and Systems (RES); Digital European Cordless Telecommunications (DECT) Common Interface Part 3: Medium access control layer" and in Annex E of ETSI ETR 310: "Traffic capacity and spectrum requirements for multi-system and multi-service applications co-existing in a common frequency band". The traffic channel selection is performed by the mobile station. For symmetric duplex channels the first half of the frame (5 ms) is used for downlink time slots and the second half (5 ms) is used for the uplink time slots. For duplex channels each downlink time slot is paired with an uplink time slot, both operating on the same carrier frequency. The mobile station selects for each new call or handover the channel (duplex pair) that is least interfered of all available channels. In this process the mobile station only makes measurements in the downlink frame. The reason that only measurement on the downlink is needed, is that for duplex connections, the corresponding uplink is only used together with the downlink. Therefore, there is a very high local correlation between the quality of the measured downlink and the quality of the corresponding following duplex connection, and it is enough to use the downlinks for quality estimates of the duplex channels. For TDMA-TDD/FDD in accordance with the present invention, the downlink and uplink frames do not only use different parts of the duplex frame (first and second half), but also different carrier frequencies (see FIG. 5). This change does not require any change to the basic DCS procedure referred to above. It is still enough to use only the downlink frames for quality estimates of the duplex channels, as long as the mobile station only shall have access to synchronized base stations with the same time offset (only one of the sets of base stations).

However, for the TDMA-TDD/FDD system of the present invention, the two carriers are only used half of the time for each set of base stations. Therefore, as described above with respect to FIG. 5, two sets of base stations can be defined with frames having half a duplex frame relative offset (or with 3 sets of base stations as in FIG. 9, 1/3 duplex frame relative offset). In this way the carriers FTX and FRX are fully used. As long as each mobile station is supposed to have access to only one of the base station sets, the above basic DCS procedure still applies (is a reasonable limitation for RLL applications). But if a mobile station shall have access to all sets of base stations and be able to make handover between them, the above DCS procedure has to be modified. The mobile station is always locked to one base station belonging to one set of base stations. To make a handover or a call set up to a base station belonging to another set, the mobile station must scan the downlinks with the offset as defined for this new set. Thus the change in the DCS is that the mobile station must be able to scan on its receive carrier, not only half the duplex frame, but the whole duplex frame.

Figure 11:
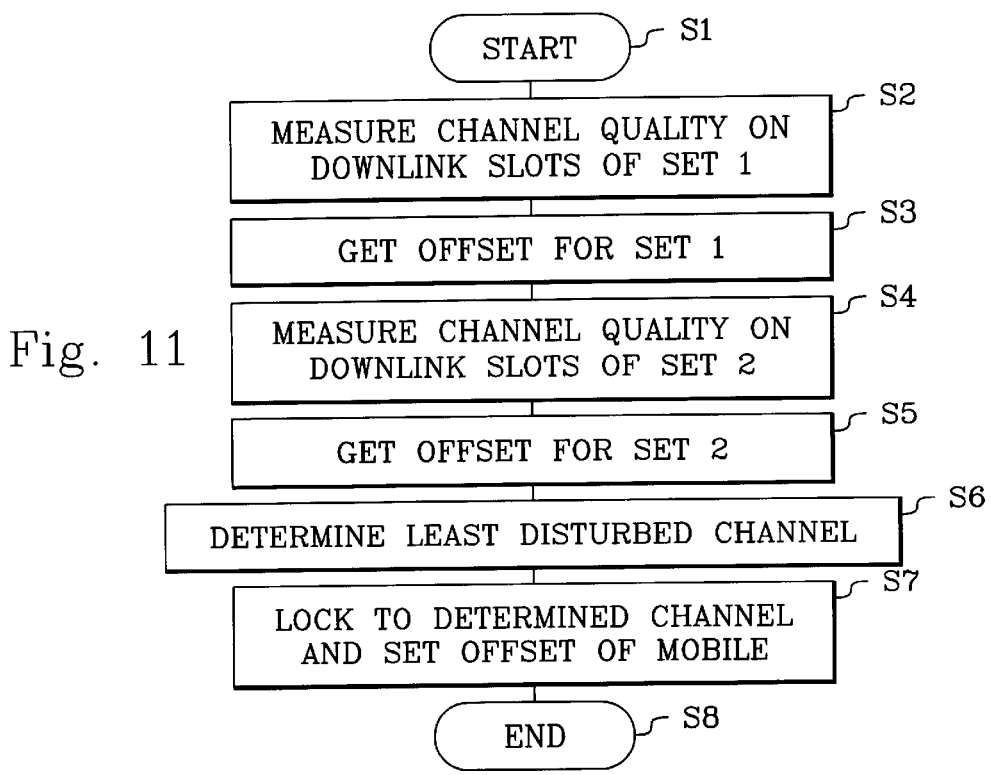
FIG. 11 is a flow chart illustrating a dynamic channel selection method suitable for a TDMA-TDD/FDD system operating in accordance with the embodiment of FIG. 5.

FIG. 11 is a flow chart illustrating a dynamic channel selection method suitable for a TDMA-TDD/FDD system operating in accordance with the embodiment of FIG. 5. The procedure starts in step S1. Step S2 measures channel quality on downlink frames belonging to set 1 of base stations. In step S3 offset information regarding set 1 is received by the mobile station. Step S4 measures channel quality on downlink frames belonging to set 2 of base stations. In step S5 offset information regarding set 2 is received by the mobile station. Step S6 decides which downlink channel on which frequency is least disturbed, and step S7 locks onto the corresponding channel and adjusts the timing in accordance with the offset for the corresponding set of base stations. This ends the procedure in step S8.

Figure 12:
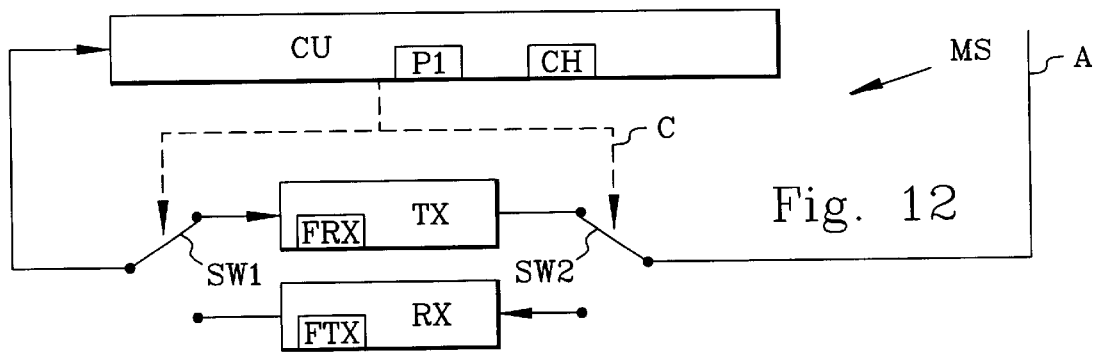
FIG. 12 is a simplified block diagram of a mobile station suitable for performing the dynamic channel selection method in FIG. 11.

FIG. 12 is a simplified block diagram of a mobile station MS suitable for performing the dynamic channel selection method in FIG. 11. A transmitter TX and a receiver RX are controlled by a control unit CU over switches SW1, SW2, which are controlled by a control signal C. Switches SW1, SW2 connect either transmitter TX or receiver RX to control unit CU and an antenna A. When mobile station MS is not transmitting it measures interference level and timing in time slots (from base stations in both sets) on carrier frequencies in the downlink frequency band. It also continuously updates a memory location CH, which stores the channel identification of the least disturbed channel and its timing. Control unit CU is typically implemented by a micro processor or a micro/signal processor combination and a corresponding control program P1.

For the embodiment of FIG. 7 the mobile station does not have to consider an offset between different sets of base stations in connection with DCS. However, since there are now downlinks on two frequencies F1 and F2 simultaneously, it has to measure channel quality on two downlink frequency bands instead of one frequency band. It must also be capable of transmission and reception on either band, since it may lock to a base station from either set.

Figure 13:
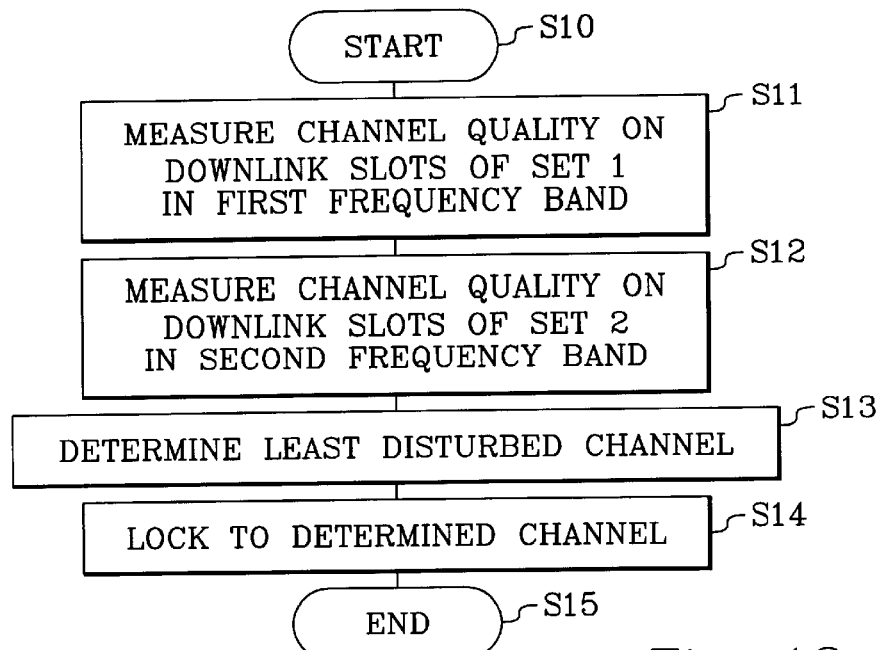
FIG. 13 is a flow chart illustrating a dynamic channel selection method suitable for a TDMA-TDD/FDD system operating in accordance with the embodiment of FIG. 7.

FIG. 13 is a flow chart illustrating a dynamic channel selection method suitable for a TDMA-TDD/FDD system operating in accordance with the embodiment of FIG. 7. The procedure starts in step S10. Step S11 measures, in the mobile station, channel quality on downlink frames belonging to set 1 of base stations, which transmit in a first frequency band. Similarly, step S12 measures channel quality on downlink frames belonging to set 2 of base stations, which transmit in the second frequency band. Step S13 decides which downlink channel is least disturbed, and step S14 locks onto the corresponding channel. This ends the procedure in step S15.

Figure 14:
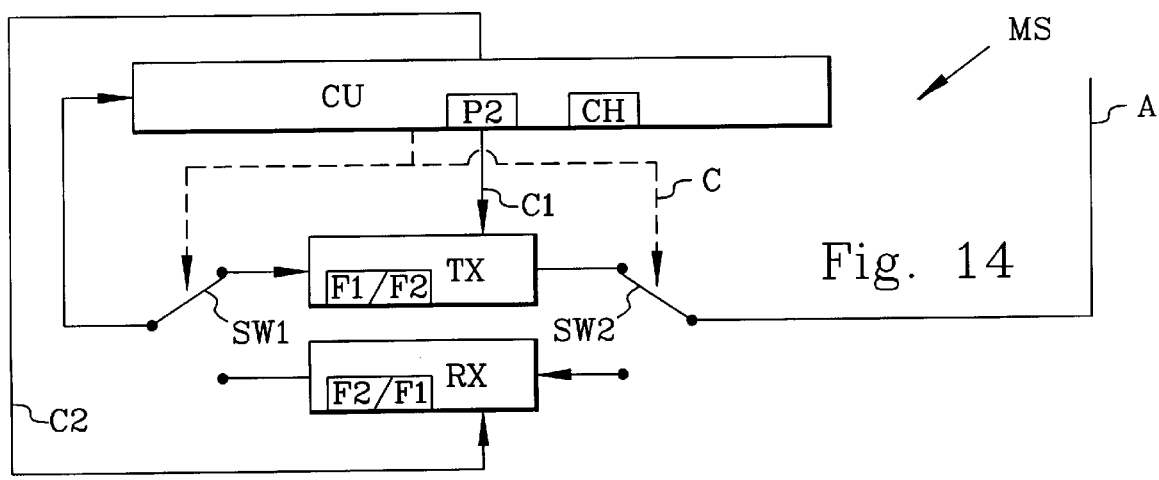
FIG. 14 is a simplified block diagram of a mobile station suitable for performing the dynamic channel selection method in FIG. 13.

FIG. 14 is a simplified block diagram of a mobile station suitable for performing the dynamic channel selection method in FIG. 13. This block diagram is similar to the block diagram in FIG. 12. The main difference is that control unit CU executes another control program P2, which measures interference in time slots in both frequency bands. Control unit CU also controls (with control signals C1 and C2) transmitter TX and receiver RX to transmit and receive in either band, depending on the currently selected channel.

It will be understood by those skilled in the art that various modifications and changes may be made to the present invention without departure from the spirit and scope thereof, which is defined by the appended claims.

What is claimed is:

1. A TDMA radio communication system combining time and frequency division duplex, said system comprising:
    a first base station having a first radio coverage area and transmitting in first down link frames on a first carrier frequency and receiving in first uplink frames, which have no time overlap with said first downlink frames, on a second, different carrier frequency;
    a second base station having a second radio coverage area and transmitting in second down link frames on said first carrier frequency and receiving in second uplink frames, which have no time overlap with said second downlink frames, on said second carrier frequency, said second radio coverage area partially overlapping said first radio coverage area, and said second base station being geographically separated from said first base station in order to prevent transmissions from either base station disturbing reception on radio terminals on the other base station;
    a network controller synchronizing transmission from said first and second base stations and offsetting transmission from said second base station by one downlink frame relative to transmission from said first base station, wherein mobile radio terminals monitor channel quality and offset on downlink frames from both base stations for performing mobile radio terminal controlled dynamic channel selection in connection with call setup and handover.

2. The system of claim 1, wherein each downlink frame has 1 time slot associated with a connection.

3. The system of claim 1, wherein each downlink frame has 2 time slots associated with a connection.

4. The system of claim 1, wherein
    said first base station belongs to a set of base stations having a predetermined transmission timing;
    said second base station belongs to a second set of base stations, which is synchronized with said first set of base stations, but has a transmission timing offset of one downlink frame relative to said transmission timing of said first set of base stations;
    said first frequency belongs to a first frequency band used by base stations in both sets of base stations; and
    said second frequency belongs to a second frequency band used by base stations in both sets of base stations, said second frequency band having no frequency overlap with said first frequency band.

5. The system of claim 4, wherein
    said first set of base stations is allocated to a first operator; and
    said second set of base stations is allocated to a second operator.

6. The system of claim 4, wherein communication between said first and second sets of base stations on one hand and said network controller on the other hand is performed on said first and second frequency bands, said network controller having means for allowing simultaneous transmission and reception, whereas said base stations not having such means.

7. A TDMA radio communication system combining time and frequency division duplex said system including
    a first base station transmitting in first downlink frames on a first carrier frequency and receiving in first uplink frames, which have no time overlap with said first downlink frames, on a second, different carrier frequency,
    a second base station transmitting in second down link frames on said second carrier frequency and receiving in second uplink frames, which have no time overlap with said second down link frames, on said first carrier frequency; and
    a network controller synchronizing and time aligning transmission from said first and second base stations.

8. The system of claim 7, including a symmetric mode in which downlink frames contain the same number of time slots as up link frames.

9. The system of claim 7, including an asymmetric mode in which downlink frames contain a different number of time slots as compared to uplink frames.

10. The system of claim 7, wherein mobile radio terminals monitor channel quality on downlink frames from both base stations for performing mobile radio terminal controlled dynamic channel selection in connection with call setup and handover.

11. The system of claim 7, wherein
    said first base station belongs to a set of base stations having a predetermined transmission timing;
    said second base station belongs to a second set of base stations, which is synchronized and time aligned with said first set of base stations;
    said first frequency belongs to a first frequency band used by base stations in both sets of base stations; and
    said second frequency belongs to a second frequency band used by base stations in both sets of base stations, said second frequency band having no frequency overlap with said first frequency band.

12. The system of claim 11, wherein
    said first set of base stations is allocated to a first operator; and
    said second set of base stations is allocated to a second operator.

13. The system of claim 11, wherein communication between said first and second sets of base stations on one hand and said network controller on the other hand is performed on said first and second frequency bands, said network controller having means for allowing simultaneous transmission and reception, whereas said base stations not having such means.

14. A mobile radio terminal in a TDMA radio communication system combining time and frequency division duplex, said system including
    a first base station having a first radio coverage area and transmitting in first downlink frames on a first carrier frequency and receiving in first uplink frames, which have no time overlap with said first downlink frames, on a second, different carrier frequency:
    a second base station having a second radio coverage area and transmitting in second downlink frames on said first carrier frequency and receiving in second uplink frames, which have no time overlap with said second down link frames, on said second carrier frequency, said second radio coverage area partially overlapping said first radio coverage area, and said second base station being geographically separated from said first base station in order to avoid that transmission from one base station disturbs reception from radio terminals on the other base station; and a network controller synchronizing transmission from said first and second base stations and offsetting transmission from said second base station by one downlink frame relative to transmission from said first base station, said mobile radio terminal including a control unit for monitoring channel quality and offset on down link frames from both base stations for performing mobile radio terminal controlled dynamic channel selection in connection with call setup and handover.

15. A mobile radio terminal in a TDMA radio communication system combining time and frequency division duplex, said system including a first base station transmitting in first down link frames on a first carrier frequency and receiving in first uplink frames, which have no time overlap with said first downlink frames, on a second, different carrier frequency:

a second base station transmitting in second down link frames on said second carrier frequency and receiving in second uplink frames, which have no time overlap with said second downlink frames, on said first carrier frequency; and a network controller synchronizing and time aligning transmission from said first and second base stations, said mobile radio terminal including a control unit for monitoring channel quality on downlink frames from both base stations for performing mobile radio terminal controlled dynamic channel selection in connection with call setup and handover.

16. A dynamic channel selection method in a mobile radio terminal in a TDMA radio communication system combining time and frequency division duplex, said system including a first base station transmitting in first downlink frames on a first carrier frequency and receiving in first up link frames, which have no time overlap with said first downlink frames, on a second, different carrier frequency:

a second base station transmitting in second downlink frames on said second carrier frequency and receiving in second uplink frames, which have no time overlap with said second downlink frames, on said first carrier frequency; and a network controller synchronizing and time aligning transmission from said first and second base stations, said dynamic channel selection method including the steps monitoring channel quality on down link frames from both base stations;

selecting a channel based on said channel quality; and locking said mobile radio terminal to said selected channel.

* * * * *